April 9, 1968  C. W. HEWLETT, JR  3,377,521

SOLION CELLS HAVING ELECTROLYTE FOR LOW-TEMPERATURE OPERATION

Filed July 2, 1965

INVENTOR:
CLARENCE W. HEWLETT, JR
BY Richard E. Horley
ATTORNEY

United States Patent Office 3,377,521
Patented Apr. 9, 1968

3,377,521
SOLION CELLS HAVING ELECTROLYTE FOR LOW-TEMPERATURE OPERATION
Clarence W. Hewlett, Jr., Hampton, N.H., assignor to General Electric Company, a corporation of New York
Filed July 2, 1965, Ser. No. 469,186
9 Claims. (Cl. 317—231)

ABSTRACT OF THE DISCLOSURE

A solion cell for low-temperature operation. A plurality of closely fitted, stacked elements including platinumiridium alloy electrodes are disposed in a glass envelope and surrounded with a eutectic aqueous solution of either iodine and sodium iodide or iodine, sodium iodide, and potassium iodide.

Background of the invention

The present invention relates to improvements in electrochemical devices of the so-called "solion" type, and, in one particular aspect, to solion cells wherein unique and improved electrolyte solutions, forming a reversible redox system, advantageously reduce the useful operating temperature levels and lessen the risks of destructive freezing.

As is now well established in the art, phenomena associated with the physically and electrically regulated concentrations and migrations of ions in solution can be advantageously exploited to develop electrical characteristics akin to those more conventionally associated with classical forms of amplifiers, diodes, integrators and the like. Solion devices based on such phenomena commonly include a number of elements, such as electrodes, spacers and diffusion barriers hermetically sealed within a relatively frangible glass envelope having a fill of an electrolytic solution in which fully reversible reactions (i.e. comprising a reversible redox system) may take place. One particularly attractive operating mode for these devices involves their functioning as integrators, in which role they are capable of performing extraordinarily long-term integrations of electrical signals, even though miniaturized to diminutive proportions. The nature of a typical solion cell is such that it requires an electrically insulating fully sealed housing which will withstand corrosive influences of the electrolyte confined within it and will not release contaminants into the electrolyte; generally, a glass envelope such as one of Pyrex glass, is used for such reasons. Internal elements for the cell are compactly arrayed and maintained within very close tolerances inside the glass envelope. Extremes of environmental exposures of these devices can in some instances be expected to subject them to temperatures well below the −16° C. level at which ice begins to form in the common aqueous electrolyte solution of 4 normal potassium iodide and 0.01 normal iodine. These icing effects undesirably alter the operating characteristics of solion devices and, when the electrolyte freezes solidly, cell operation ceases and permanent damage invariably results from attendant forceful expansions which will crack even a thick glass envelope. In accordance with the present teachings, the capabilities for successful operation of solions are brought to lower temperatures than were heretofore considered possible, and freezing complications have been relegated to much lower levels, through use of special electrolyte solutions which are low-temperature eutectic mixtures.

It is one of the objects of the present invention, therefore, to provide novel and improved electrochemical devices of the solion type which operate successfully and avoid structural failures at very low temperatures.

Another object is to provide low-temperature solions having unique electrolyte solutions which are eutectic mixtures of materials serving to form a reversible redox system and exhibiting favorable corrosive characteristics.

A further object is to provide new and advantageous solion cells incorporating an electrolyte wherein sodium iodide is in substantially a eutectic mixture with potassium iodide to reduce the temperatures at which ice and freezing are developed.

Summary

By way of a summary account of practice of this invention in one of its aspects, an improved solion integrator comprises an array of compactly stacked elements closely fitted within a sealed tubular glass envelope. The conductive metal electrodes included among these elements are preferably made of an alloy of substantially pure platinum and about 20% by weight of substantially pure iridium, and these are constructed and oriented to function as the usual input, shield, readout and common electrodes for a tetrode integrator. An aqueous electrolyte solution which substantially fills the glass envelope and is in contact with the internal electrodes comprises about 4.37 normal sodium iodide, 0.76 normal potassium iodide, and 0.01 normal iodine. This eutectic mixture does not freeze until it reaches a temperature of −32.8° C.

Although the aspects and features of this invention which are believed to be novel are expressed in the appended claims, additional details as to preferred practices and embodiments, and as to the further advantages, objects and features therof, may be most readily comprehended through reference to the following description taken in connection with the accompanying drawings.

Description of the preferred embodiments

Figure 1:
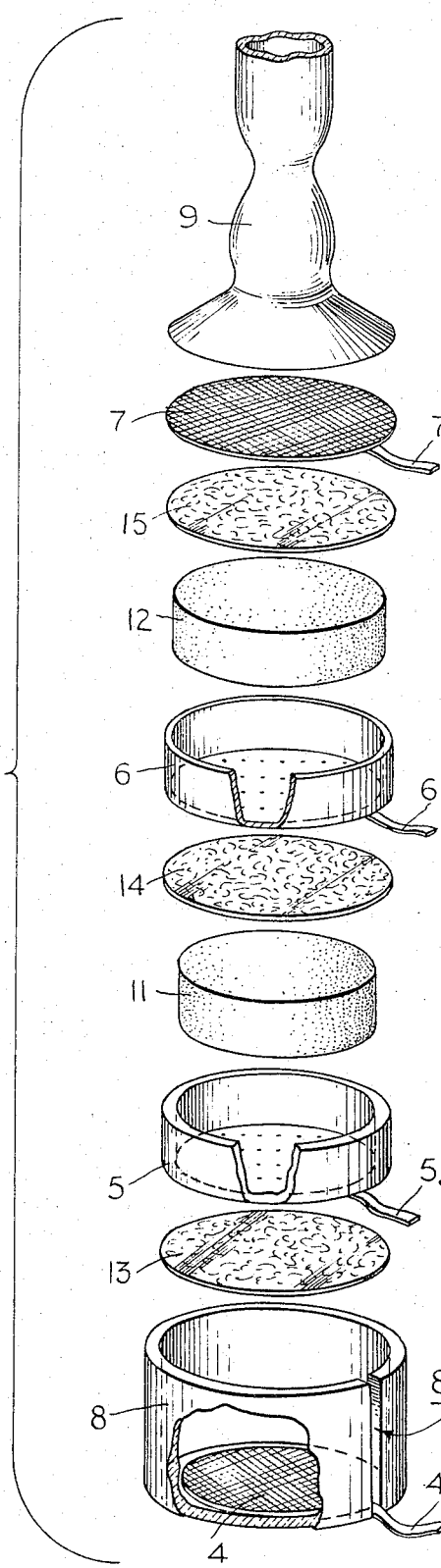
FIGURE 1 illustrates the structural components of a solion integrator cell, in an exploded view.
Figure 2:
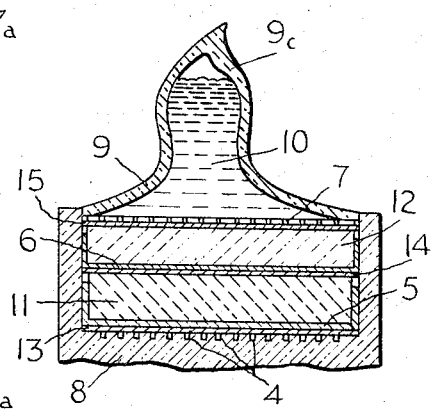
FIGURE 2 is a cross-sectioned side view of the same cell which has ben sealed after being filled with the improved electrolyte solution.

The array depicted in FIGURE 1 is of the major structural components which may be assembled to form one type of solion device, specifically a tetrode integrator, with which an improved electrolyte solution may be used to lower the safe environmental temperature levels in accordance with the present teachings. The usual four electrically conductive electrodes are present, namely a common electrode 4, readout electrode 5, shield electrode 6, and input electrode 7, which are collinearly stacked in that order, with certain other elements, within the cup-shaped vitreous envelope portion 8, the latter preferably being of Pyrex glass. When these electrodes and elements are properly packaged within the envelope portion 8, and the lead-ins of electrode contacts 4a–7a through the slot 8b have been sealed, and the glass tubular header 9 has been sealed in place and tipped off to the form 9c (FIGURE 2), and the evacuated envelope has been substantially filled with an electrolyte 10 (FIGURE 2) capable of producing a solion redox system, then the device may develop highly useful integrations of electrical signals applied by way of the common and input electrodes. More particularly, the electrical input current flowing through the electrolyte between the input (negative) and common (positive) electrodes, via their leads 7a and 4a, respectively, effects a transfer of a measured species (specifically, tri-iodide ions from iodine dissolved in an aqueous electrolyte solution) between a relatively large reservoir zone (appearing between input electrode 7 and perforated shield electrode 6) and a relatively small integral zone or chamber (appearing between the perforated readout electrode 5 and common electrode 4), the amount of measured species (iodine) transferred being proportional to the integral of input current. When a battery and current-sensing device are coupled in series with one another and with the integral chamber (i.e., via leads 4a and 5a of the positive common and negative readout electrodes), the sensed output current is proportional to the amount of iodine in the integral chamber and, hence, to the integral of the aforementioned input current. The shield electrode 6 is normally polarized negatively in relation to the input electrode 7, by a battery, for example, to enhance the characteristics of the tetrode as an efficient integrator by opposing unwanted diffusion of iodine from the reservoir zone (between electrodes 7 and 6) to the critical integral chamber (betwen electrodes 5 and 4). Diffusion barriers 11 and 12, which comprise porous inert insulating members, likewise tend to suppress unwanted diffusions, while also permitting desired electrical paths to be established through the electrolytic solution. Within the integral chamber, iodine is reduced to iodide at the readout electrode 5 and iodide is simultaneously oxidized to iodine at common electrode 4, leaving iodine concentration in that chamber unaltered (i.e. a reversible redox system is established); integration and non-destructive readout processes may be permitted to occur continuously at the same time. In the assembly of the aforesaid tetrode integrating cell, a thin quartz paper disk 13 is introduced between the common and readout electrodes 4 and 5, the cylindrical porous diffusion barrier 11 (such as one formed of fused Pyrex glass frits) and a second quartz paper disk 14 are interposed between the readout and shield electrodes 5 and 6, and the cylindrical porous diffusion barrier 12 and a third quartz paper disk 15 are interposed between the shield and input electrodes 6 and 7.

Commonly, the iodine required for production of the ions (tri-iodide ions) which enter into the measured transfers are developed by dissolving iodine in an aqueous solution of potassium iodide (such as a solution of 4 normal potassium iodide and 0.01 normal iodine); the resulting electrolyte solution is satisfactory for many solion applications, but it has been found that ice formation commences at about $-16°$ C. and that the cell becomes frozen solid at $-21°$ C. Electrolyte expansions which occur upon freezing tend to disrupt the precise arrangement of internal cell elements and, moreover, cause fracture of the glass envelope, such that the cell usefulness is then completely destroyed. Even were the envelope not cracked, however, the cell operations as a solion would be impaired so long as the freezing conditions persisted; even though operational recovery thereafter might theoretically be realized if the envelope did not rupture, the failure period obviously could result in substantial net errors in any electrical system which is responsive to measurements by the cell. However, significant low-temperature improvements are attained through use of an electrolyte solution comprising a eutectic mixture involving sodium iodide in water. Sodium iodide in water, alone, freezes at about $-30°$ C. in a eutectic mixture of about 4.8 normality. Thus, a solion integrator utilizing an electrolyte solution made with 4.8 normal sodium iodide does not have any solid materials coming out of solution until a temperature of about $-30°$ C. is reached. Each gain in the limit of low temperature operation is important, because the extended limits increase the utility of solions for scientific applications wherein they might otherwise be unsuited, and, for this reason, a highly preferred electrolyte involves a substantially eutectic mixture of sodium iodide, potassium iodide and water. Such a mixture preferably has the composition of about 4.37 normal sodium iodide and about 0.76 normal potassium iodide, and freezes at about $-32.8°$ C. The tri-iodide ions needed in this electrolyte are derived via dissolved iodine of about 0.01 normality. It is characteristic of eutectic mixtures, of course, that they tend to freeze at definite temperatures and that these temperatures are lower than the freezing points of the mixed components. To some extent, the proportions of these components may be varied from that which yields the true eutectic mixture, with consequent small deviations from the lowest theoretical eutectic temperature, and this is true also of the aforesaid preferred sodium iodide and potassium iodide combination. Deviations in temperature, from the eutectic value, as one departs from the eutectic relationship, tend to be substantially symmetrical for small increases and decreases of amounts of either the sodium iodide or potassium iodide. Preferably, the total normality of the solution is made about five.

Both potassium iodide and sodium iodide have troublesome corrosive tendencies, the latter being somewhat greater than the former. This is true even in those instances when substantially pure platinum electrodes are used in the solions, although it would not ordinarily be expected that the platinum would react sufficiently with the electrolyte substances to adversely affect cell operations. The reactions are especially pronounced at elevated temperatures, it being found, for example, that the aforesaid electrolyte solution (4.37 normal NaI, 0.76 normal KI, and 0.01 normal $I_2$) will cause a weight loss of 0.5% of 99.99% pure Pt electrode material immersed therein for 72 hours at $85°$ C. and 2 hours at $100°$ C. Weight loss increased to 1.3% when the temperature was held at $85°$ C. for 72 hours and at $100°$ C. for 288 hours. In both instances, the platinum was etched in appearance and the electrolyte became very dark and almost black. In an evaluation of a 90% Pt and 10% Ir (by weight) electrode alloy, using the same electrolyte composition and a temperature of $100°$ C. sustained for 1386 hours, the alloy weight loss was 1.3%, the etching was uniform and dull, and the electrolyte had a dark brown coloring. On the other hand, an 80% platinum and 20% iridium electrode alloy, maintained in an electrolyte of the same composition for 72 hours at $85°$ C. and for 1275 hours at $100°$ C., exhibited no noticeable weight loss, and no significant change in appearance, while the electrolyte exhibited merely a light brown coloring. Several solions constructed using platinum electrodes failed in less than thirty days of evaluation at $85°$ C., whereas solions having electrodes consisting essentially of 20% by weight of substantially pure iridium alloyed with substantially pure platinum have been evaluated in successful performance over a period of 250 days at $85°$ C. (normal operating conditions would be at about $30°$ C.). Therefore, the corrosive tendencies, at the higher temperatures, of the improved eutectic-mixture electrolye solution which is desirable for purposes of extending the low-temperature range of solion cells, makes it highly desirable that the solution be used with cells in which the immersed electrodes are of the platinum alloy including iridium, preferably about 20% by weight of iridium. With larger percentages of iridium, the very stiff alloy is exceedingly difficult to work in forming the electrodes.

It should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. A solion electrochemical cell operable over an extended temperature range comprising a sealed envelope, a plurality of spaced-apart electrodes within said envelope, and a low-freezing-temperature electrolyte which forms a reversible redox system substantially filling said envelope and in contact with said electrodes, said electrolyte being constituted by a eutectic mixture consisting of substantially 4.37 normal sodium iodide, substantially 0.76 normal potassium iodide, and iodine in an aqueous solution.

2. A solion electrochemical cell operable over an extended temperature range comprising a sealed frangible vitreous electrically insulating envelope, a plurality of spaced-apart electrodes within said envelope, and a low-freezing-temperature electrolyte which forms a reversible redox system substantially filling said envelope and in contact with said electrodes, said electrolyte being constituted by a eutectic mixture having a normality of about five and consisting substantially of sodium iodide and iodine in an aqueous solution.

3. A solion electrochemical cell operable over an extended temperature range, as set forth in claim 2, wherein said sodium iodide has a normality of at least about four.

4. A solion electrochemical cell operable over an extended temperature range, as set forth in claim 2, wherein said sodium iodide has a normality of about 4.8 and said iodine has a normality of about 0.01, whereby said eutectic mixture does not freeze until a temperature of about −30° C. is reached.

5. A solion electrochemical cell operable over an extended temperature range, as set forth in claim 3, wherein said envelope is glass, wherein said electrodes are of a platinum-iridium alloy including about twenty percent by weight of iridium, and wherein said substantially eutectic mixture includes potassium iodide.

6. A solion electrochemical cell operable over an extended temperature range, comprising a sealed glass envelope, a plurality of spaced-apart electrodes within said envelope, and a low-freezing-temperature electrolyte which forms a reversible redox system substantially filling said envelope and in contact with said electrodes, said electrolyte being constituted by a eutectic mixture consisting essentially of about 4.37 normal sodium iodide, about 0.76 normal potassium iodide, and about 0.01 normal iodine in an aqueous solution, whereby said eutectic mixture does not freeze until a temperature of about −32.8° C. is reached.

7. A solion integrator operable over an extended temperature range, comprising a sealed envelope, a plurality of spaced-apart electrodes within said envelope and including common, readout, shield and input electrodes, and a low-freezing-temperature electrolyte which forms a reversible redox system substantially filling said envelope and in contact with said electrodes, said electrolyte being constituted by a eutectic mixture having a normality of about five and consisting substantially of sodium iodide and iodine in an aqueous solution.

8. A solion integrator operable over an extended temperature range, as set forth in claim 7, wherein said sealed envelope is glass, said common, readout, shield and input electrodes are each of an alloy consisting essentially of substantially pure platinum and substantially pure iridium, and wherein said substantially eutectic mixture consists essentially of sodium iodide, potassium iodide, and iodine, whereby said eutectic mixture has a low freezing temperature and said electrodes are substantially immune to corrosion by and reaction with said solution even at relatively high temperatures.

9. A solion integrator operable over an extended temperature range, as set forth in claim 8, wherein said electrode alloy includes between about ten and twenty percent by weight of iridium, and wherein said eutectic mixture consists essentially of about 4.37 normal sodium iodide, about 0.76 normal potassium iodide, and about 0.01 normal iodine.

References Cited
UNITED STATES PATENTS

| | | | |
|---|---|---|---|
| 2,685,025 | 7/1954 | Root | 317—230 |
| 2,896,095 | 7/1959 | Reed et al. | 317—230 |
| 3,021,482 | 2/1962 | Estes | 324—94 |
| 3,289,677 | 12/1966 | Hewlett | 317—231 |

JAMES D. KALLAM, *Primary Examiner.*